United States Patent [19]
Richardson et al.

[11] Patent Number: 6,153,110
[45] Date of Patent: Nov. 28, 2000

[54] METHOD FOR CONTROLLING TREATMENT CHEMICALS IN AQUEOUS SYSTEMS

[75] Inventors: John Richardson, Mechanicsville; Michael G. Trulear, Richmond, both of Va.

[73] Assignee: ChemTreat, Inc., Glen Allen, Va.

[21] Appl. No.: 09/312,476

[22] Filed: May 17, 1999

[51] Int. Cl.⁷ ........................................................ C02F 1/00
[52] U.S. Cl. .......................... 210/739; 210/745; 210/101; 210/143; 436/43; 436/55; 137/2
[58] Field of Search ..................... 210/739, 745, 210/97, 101, 143; 436/43, 55; 137/2, 88

[56] References Cited

U.S. PATENT DOCUMENTS

| | | | |
|---|---|---|---|
| 4,544,489 | 10/1985 | Campbell et al. | 210/709 |
| 5,171,450 | 12/1992 | Hoots | 210/701 |
| 5,435,969 | 7/1995 | Hoots et al. | |
| 5,654,198 | 8/1997 | Carrier et al. | |
| 5,736,405 | 4/1998 | Alfano et al. | 436/55 |

OTHER PUBLICATIONS

Hoots, Tagged Polymer Technology . . . , Corrosion 93, Paper 397, pp. 397/1–397/7.
Hoots, Water Treatment Dosage . . . , Corrosion 95, Paper 260, pp. 260/1–260/11.
Standish, A New Polymeric Material . . . , Corrosion 96, Paper 163, pp. 163/1–163–18.
Keller, An Advanced, Field–Friendly . . . , Corrosion 98, Paper 228, pp. 228/1–228/26.
Rumelfanger, Monitoring and Control . . . , 56th Annual International Water Conference, IWC 95—5, Oct. 29–Nov. 2, 1995, pp. 1–6.
Mitchell, Novel Monitoring and Control . . . , IWC 95–7, pp. 1–7.
Huchler, An On–Line Monitoring . . . , IWC 96–53, pp. 1–8.
Hann, Toward Field–Friendly . . . , Fifty–Eighth Annual . . . , Nov. 1–5, 1997, pp. 1–12.
Garcia, Polymer Analysis . . . , Masters Chemcial, Fourth Annual Association . . . , Dec. 4–7, 1991, pp. 1–15.

*Primary Examiner*—Duane Smith
*Assistant Examiner*—Betsey Morrison Hoey
*Attorney, Agent, or Firm*—Pillsbury Madison & Sutro LLP

[57] ABSTRACT

A method is provided for monitoring and controlling the level of treatment chemicals in an aqueous system, such as a cooling water system or boiler system, through the direct measurement of one or more chemically active polymers. Polymers typically function as scale inhibitors and dispersants in a water treatment system and exist in aqueous systems in both free and bound states, the free and bound states together comprising the total polymer present in the aqueous system. The ratio of free polymer level to total polymer level defines the polymer inhibition efficiency of the system and provides an indication of the effectiveness of the water treatment program. The total polymer level may be used to determine the volume of treatment chemicals added to the system, while the free polymer to total polymer ratio indicates the dosage required to maintain system performance.

20 Claims, 6 Drawing Sheets

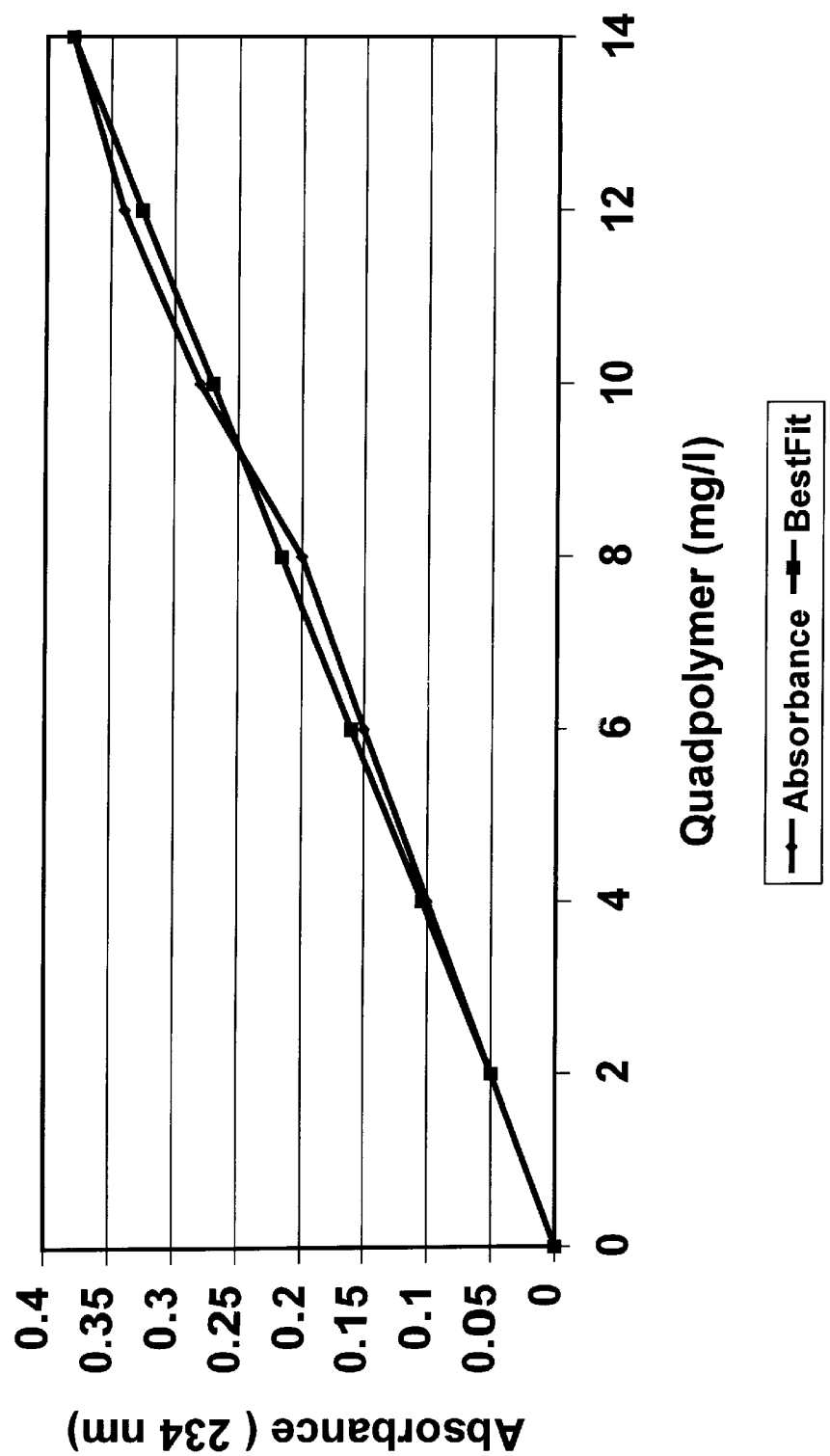
Figure 1. Polymer Measurement Calibration Curve

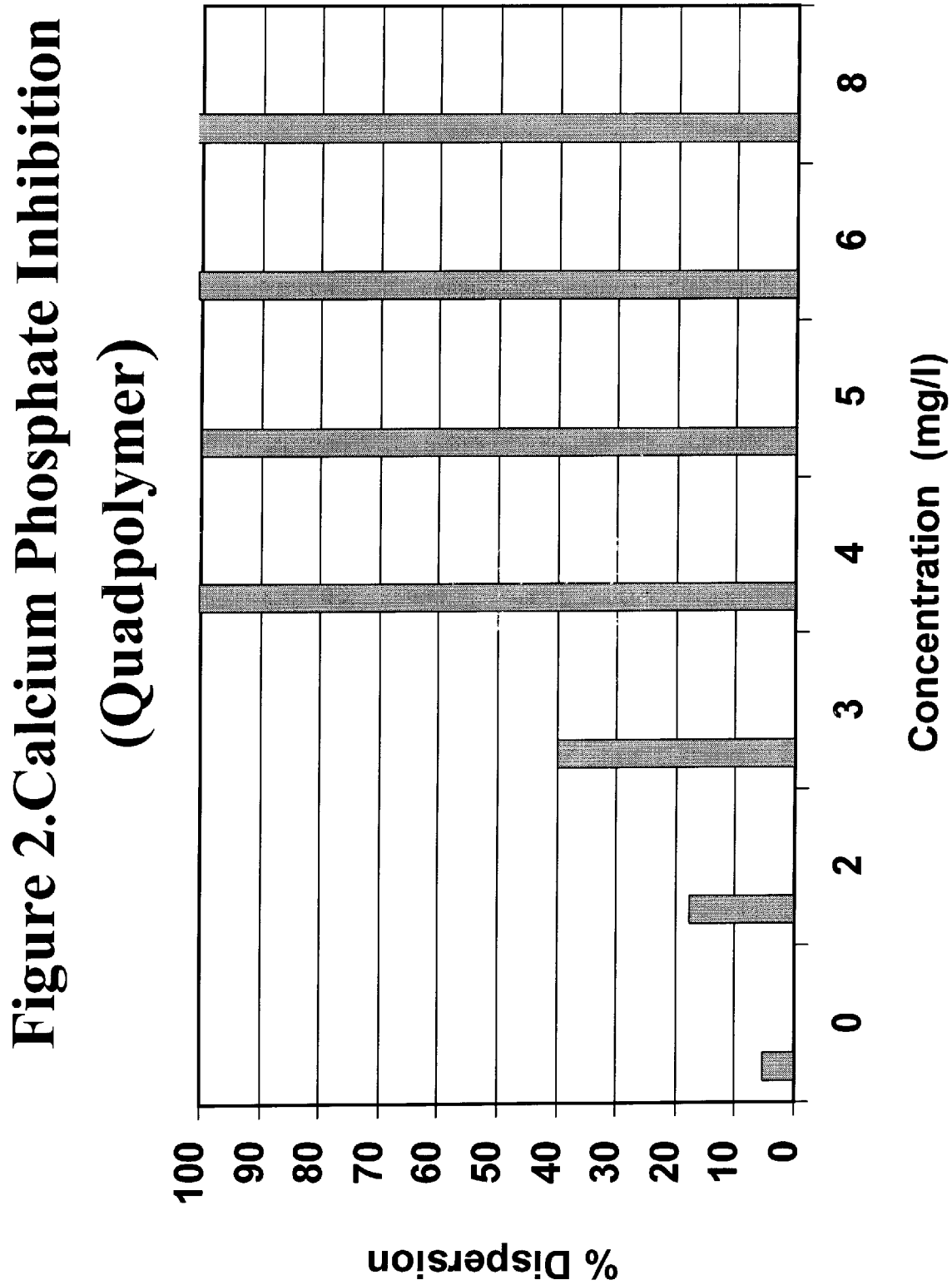

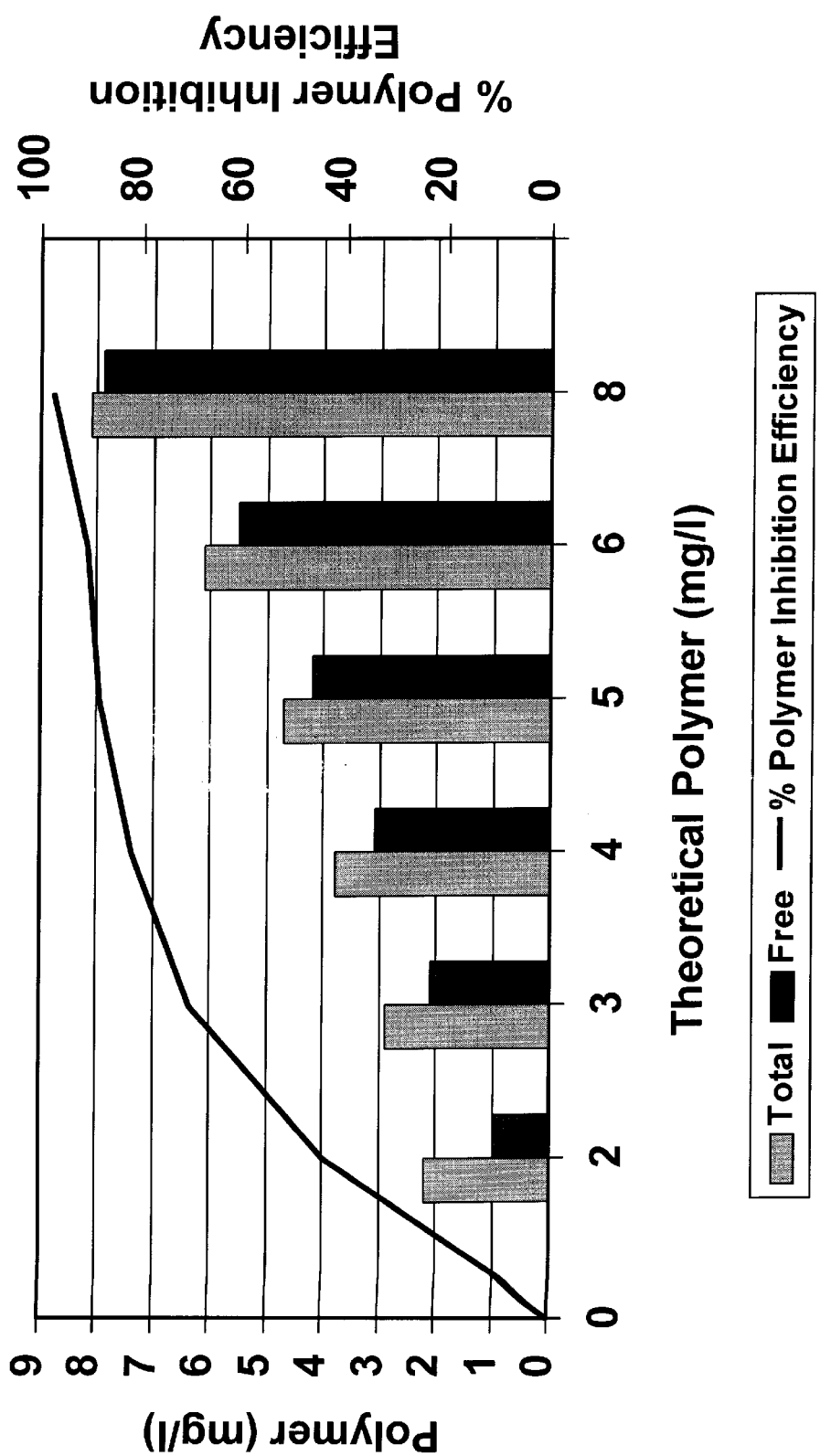
Figure 3. Calcium Phosphate Inhibition - Free & Total Polymer

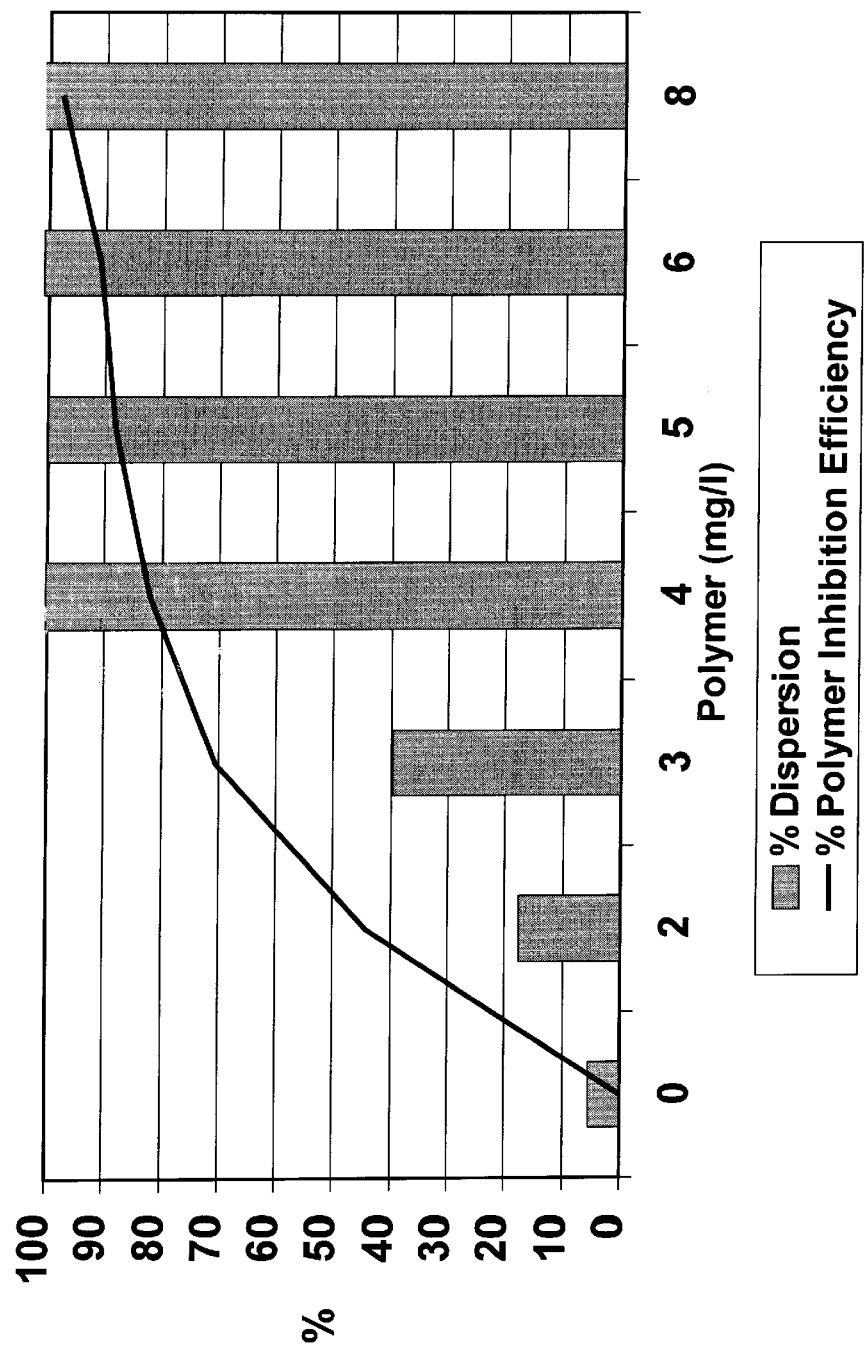
Figure 4. Calcium Phosphate Inhibition and Polymer Inhibition Efficiency Figure 5 Pilot Cooling Tower
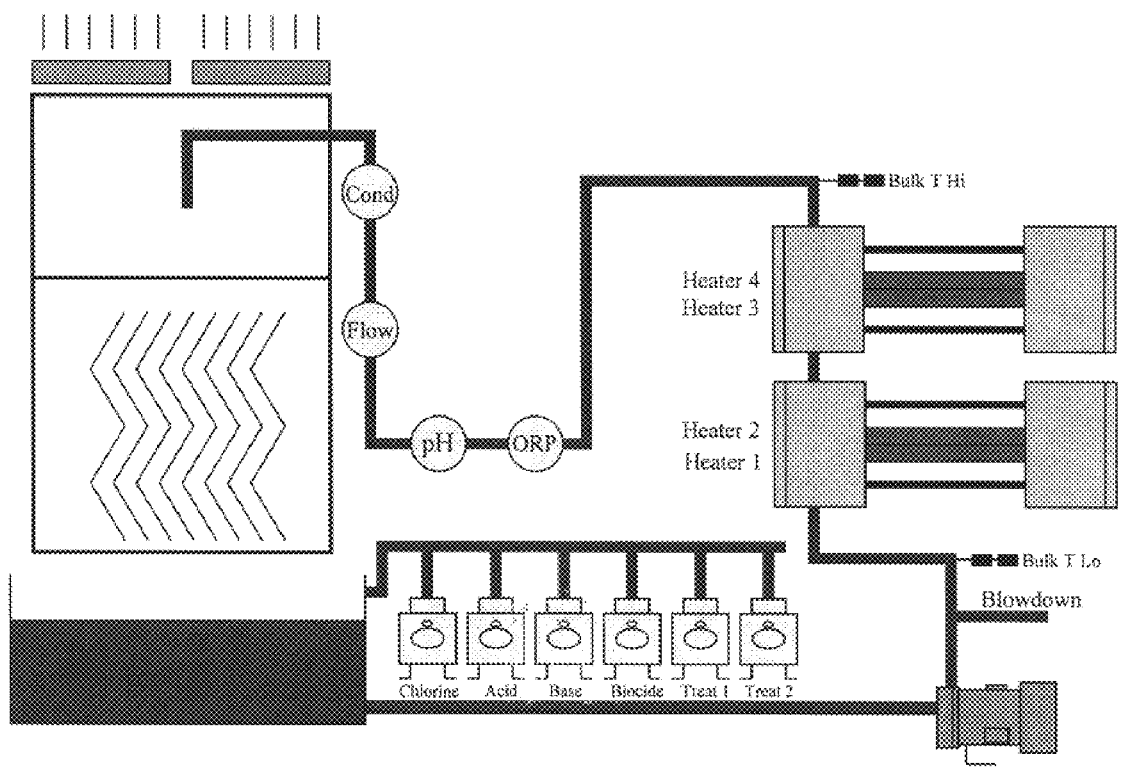

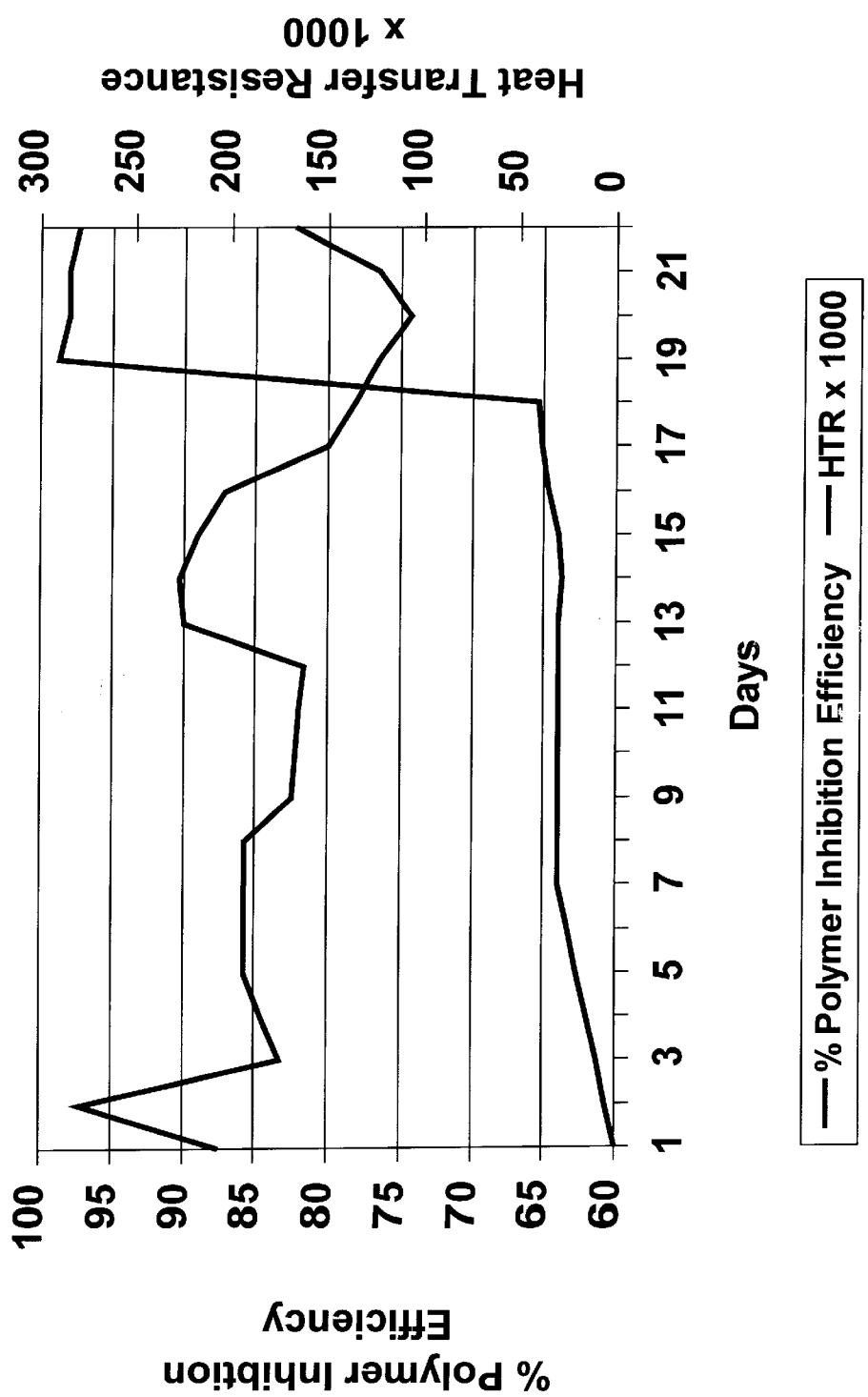
Figure 6. Pilot Cooling Tower Test - % Polymer Inhibition Efficiency and HTR

METHOD FOR CONTROLLING TREATMENT CHEMICALS IN AQUEOUS SYSTEMS

BACKGROUND OF THE INVENTION

1. Field of the Invention

The present invention relates to a method for measuring the performance and controlling the levels of polymeric dispersants and other treatment chemicals in industrial cooling and boiler water systems.

2. Description of the Related Art

Maintaining proper residual levels of water treatment chemical actives is critical to the success of high-performance water treatment programs. To function properly, these programs rely on numerous active components including polymers, phosphonates, azoles, chelants, oxygen-scavengers, and, frequently, inorganic inhibitors such as phosphate and zinc. To provide optimum cost and performance, each active component in the water treatment program must be consistently maintained at residual levels sufficient to achieve treatment efficacy without relying on unnecessarily high levels of treatment chemicals.

Traditionally, treatment residuals have been monitored and controlled by analyzing grab samples and manually adjusting chemical feed based on the results of the testing. Tests that are frequently run using this approach include phosphate, phosphonate, and molybdate. Relatively simple colorimetric tests are readily available for these ingredients and have been used for many years. In contrast, simple analytical tests have generally not been available for directly measuring residual polymer levels. Techniques that have emerged rely on the use of inert fluorescent tags attached to the polymer as described in "Tagged Polymer Technology for Improved System Monitoring and Control" Corrosion 93, NACE, Paper 397, 1993. More recently, specific proteins have been attached to the polymer which give a response to an antibody test as described for example in "Toward Field Traceable Polymeric Dispersants" $58^{th}$ International Water Conference, Nov.1–5, 1997, Pittsburgh, Pa. However, because both the fluorescent tag and the antibody tests are measuring the level of the polymer indirectly, aggressive system environments sufficient to separate the polymer from the tag or degrade the tag will render the tests unreliable. Further, because the basic polymer must be modified in order to be detected by these tests, the majority of commercially available polymeric dispersants are rendered unsuitable.

In solution, a polymer may function as a dispersant with respect to existing particulates and it may also inhibit the formation or growth of scale forming particles. When a polymer is added to a water treatment system it typically reacts both chemically and physically. Some portion of the added polymer may be adsorbed onto immobile surfaces or may be thermally, chemically, or biochemically degraded as a result of system conditions. This polymer, whether rendered immobile or degraded, is essentially lost from the system and will not be detected by sampling the system water. This loss of polymer has been termed "Polymer Demand." The remaining polymer is essentially present in three forms; unreacted polymer, polymer associated with inhibited particles functioning as a scale inhibitor, and polymer absorbed onto undeposited scale functioning as a dispersant.

Recently introduced polymer test methods, however, are typically either indiscriminate or limited as to which forms or form of polymer may be measured by the disclosed test method. The antibody test, for instance, measures only the unreacted polymer. In light of this limitation, the proponents of the antibody test have suggested that simply maintaining a measurable level of unreacted polymer indicates that there is sufficient polymer available for the desired inhibition and dispersant functions.

In contrast to the antibody method, the fluorescent tagged polymer test measures the system polymer demand by comparing the levels of the tagged polymer and an inert fluorescent tracer fed at fixed ratio to the tagged polymer. The proponents of the fluorescent tagged polymer test recognize that the polymer demand increases as the severity of operating conditions increase, but do not suggest a method for distinguishing between various forms of polymer that will be found in the system. Consequently, although the disclosed method for using the fluorescent tagged polymer test to monitor the system polymer demand can determine if the minimum dosing requirements are being met, this method does not detect instances in which the polymer and/or other treatment chemicals are being overdosed.

SUMMARY OF THE INVENTION

It is an object of the present invention to provide a method for monitoring and controlling and optimizing the concentration of polymeric dispersants in aqueous systems including both cooling water and boiler operations. It is another object of the present invention to provide a method for the direct measurement of free and total polymeric dispersant in an aqueous system. It is another object of the invention to provide a method for measuring the polymer performance in an aqueous system. It is another object of the invention to provide a method for monitoring and controlling the polymer inhibition efficiency in a water system to optimize performance of the system. It is another object of the invention to provide a method for monitoring and controlling the concentration of various chemical actives in an aqueous system that can be implemented in manual, semiautomatic, or automatic systems.

Recognizing the need for improvement in the monitoring and control of treatment components, the present polymer "actives-based" monitoring and control approach was developed utilizing a particular quad-polymer as the active component. The benefits of this quad polymer are described in "A New Polymeric Material For Scale Inhibition And Removal", CORROSION 96, paper no. 163, NACE; and in Alco Chemical Company Product Bulletin TB 4261. As used herein, the term quad-polymer is used to refer to a polymer with four distinct monomers. One anionic quad-polymer useful in the present invention is Quadrasperse™ which is offered by Chem Treat, Inc. in its Quadrasperse™ line of water treatment compositions. It will be appreciated that the differential polymer measurement technique of the present invention, described in more detail below, may be suitably adapted or tailored to measure and control a variety of polymers including homo-polymers, co-polymers, and ter-polymers and to meet a variety of system and end-user needs. In particular, it has been found that the chemically active polymers that incorporate one or more functional groups, for example aromatic groups, that exhibit a distinct chromaphore or spectroscopic activity in, for example, the UV or UV-vis spectrums may be used in practicing the present invention. Such polymers permit the direct measurement of the polymer levels in the water system samples in connection with the present invention, thereby avoiding the expense and uncertainly associated with fluorescent tags, protein tags, or other inert or inactive tracer species.

BRIEF DESCRIPTION OF THE DRAWINGS

FIG. 1 shows a calibration curve for the quad-polymer used in the invention.

FIG. 2 shows the % Dispersion vs. Concentration mg/l for a calcium phosphate inhibition test using the quad polymer.

FIG. 3 shows the measurement of free and total polymer from a calcium phosphate test and the ratio of free to total polymer as a percentage, this ratio being expressed as the percent polymer inhibition efficiency.

FIG. 4 shows the % Dispersion and its relationship to % Polymer Inhibition Efficiency in the calcium phosphate inhibition test.

FIG. 5 shows a schematic of a pilot cooling tower and includes key features of the data acquisition system.

FIG. 6 shows results of a pilot cooling tower test conducted with the quad-polymer indicating the relationship between % Polymer Inhibition Efficiency and Heat Transfer Resistance.

DETAILED DESCRIPTION OF THE PREFERRED EMBODIMENT

The level of total polymer in an aqueous system is determined by applying the test procedure on an unfiltered sample of treated water. The level of free polymer is determined by first filtering a sample of the treated water through a 0.45 μm filter and then applying the test procedure to the filtered sample. The term free polymer should be understood to refer to the quantity of "unbound and readily available polymer" in the system, including polymer associated with colloidal materials that are capable of passing through a sub micron filter. The term absorbed polymer or bound polymer should be understood to refer to polymer that, although still "present" in the aqueous phase, is bound to or associated with particulate or other potential deposit-forming material to such a degree that it is unable to pass through a sub micron filter. The term total polymer refers to the sum of free polymer and bound polymer in the sample.

By comparing levels of free and total polymer, the aqueous system's polymer inhibition efficiency can be determined and monitored. Based on studies undertaken by the applicants, it was determined that optimum performance is generally obtained when the polymer inhibition efficiency is at least 70%. It was also determined that polymer inhibition efficiency values of near 100% are a strong indicator of overfeeding of polymer, a condition that could lead to corrosive conditions and most certainly increases the cost of system operation.

A key component of the present invention was the development of a procedure for measuring the relative levels of free and total polymer present in samples drawn from a treated water system water system. The applicants discovered that a key relationship exists between the free and total polymer concentration as determined from measurement of filtered and unfiltered samples of the system water. This key relationship was termed the polymer inhibition efficiency and could be expressed as a percentage according to the following formula:

% Polymer Inhibition Efficiency=(Free Polymer/Total Polymer)×100%

In one embodiment of the invention, the level of free polymer is determined by filtering a sample through a 0.45 μm filter, followed by acidification or chelation to solublize any fine scale forming or colloidal particles remaining in the sample. The solublization releases into solution all of the polymer in the sample that may have been bound or incorporated into the fine particulates. The level or concentration of the polymer in the filtered and treated sample is then quantified to determine the free polymer concentration. For the measurement of total polymer, an unfiltered sample is similarly acidified or chelated to solublize scale forming particles. The level or concentration of the polymer in the unfiltered sample is then quantified to determine the total polymer concentration.

According to another embodiment of the present invention, a measured sample of the treated water is collected and split into two containers, one sample is then filtered through a sub micron filter and the filtrate collected. The concentration of polymer in both the filtered and unfiltered samples is then determined by the following sequence. The sample is passed through a cationic resin cartridge in which the majority of both the preferred anionic quad-polymer and other anionic species become reversibly bound to the resin. The cationic resin cartridge is then washed with a dilute acid solution to remove weakly bound species. This first wash is then followed by a second wash with a measured volume of a more concentrated acid solution to release and extract the reversibly bound polymer and produce a sample of a concentrated polymer solution.

The concentrated polymer sample is then placed into an appropriate spectroscopy test cell and its absorption spectra measured using an ultraviolet-visible (UV-Vis) spectrophotometer. A predetermined calibration curve of polymer concentration vs. adsorbance for the tested spectra is then used to determine the concentration of polymer in the cooling water sample. FIG. 1 shows a calibration curve prepared for the preferred quad-polymer. Although adsorption spectroscopy is preferred, transmission spectroscopy and emission spectroscopy could be utilized in a similar fashion. Turbidimetric measurements can also be used to determine and compare the levels of free polymer and total polymer. In such a method, the polymer present in both an unfiltered sample (total polymer) and a filtered sample (free polymer) are caused to precipitate and the turbidity of the resulting samples are measured and compared with a calibration curve.

According to another embodiment of the present invention, a measured sample of the treated water is collected and split into two containers, one sample is then filtered through a sub micron filter and the filtrate collected the other sample is not filtered. The concentration of polymer in each sample is then determined using the following sequence. Four drops of a 38% solution of the sodium salt of ethylene diamine tetra acetic acid (EDTA) are added to a 25 ml sample of the test water. The sample is introduced into a spectrometer configured to measure absorbance at 490 nm and the spectrometer adjusted to read zero. The sample is removed and 1 ml of a 10% solution of monoethanol amine (MEA) is added, followed by 1 ml of a 1% benethonium chloride solution and 0.2 g of potassium chloride. The sample is mixed and allowed to stand for three minutes. The sample is then reintroduced into the spectrometer and absorbance again measured at 490 nm. Using a predetermined calibration curve of Polymer Concentration vs. Absorbance at 490 nm, the concentration of polymer in the sample can be determined.

The applicants also developed a laboratory calcium phosphate inhibition test to evaluate the effectiveness of polymeric dispersants. The following stock solutions were prepared:

Stock solution A: 12.2425 g/l of calcium chloride dihydrate (adjusted to pH 8.5 with 0.1 N NaOH)

Stock solution B: 7270 g/l of sodium dihydrogen phosphate

Stock solution C: 10.3050 g/l of boric acid 12.4258 g/l of potassium chloride

Two liters of a buffered test solution were then prepared from the stock solutions by mixing 100 ml of solution A, 50 ml of solution C, and approximately 1.85 liters of de-ionized water and adjusting the pH of the resulting solution to pH 8.3 using a 0.1 N sodium hydroxide solution.

According to the test procedure developed by the applicants, 96 ml of the buffered test solution was added to a clean 125 ml Erlenmeyer flask, followed by a small volume of the treatment chemical solution, approximately 0.1 ml, to produce a solution having less than 30 mg/l of the polymer. The flask was then sealed and the solution was stirred and heated to 60° C. in a rotator incubator. When the solution reached 60° C., four separate 1 ml aliquots of stock solution B were added to the flask at five minute intervals. After the final aliquot had been added, the temperature and stirring were maintained for an additional 20 minutes. The contents of the test solution were then transferred to a 100 ml glass graduated cylinder and the graduated cylinder sealed. The solution was then allowed to stand for 24 hours at room temperature.

A 13 ml sample was then extracted from the room temperature solution from about the 70 ml mark of the graduated cylinder. A first 5 ml portion of the 13 ml sample was then withdrawn, a single drop of a 0.1 N hydrochloric acid solution was added, and the volume was adjusted to 50 ml using de-ionized water. The resulting solution was then analyzed for phosphate content to determine the level of dispersed phosphate. A second 5 ml portion was then withdrawn from the remaining 8 ml of sample, filtered through a 0.45 $\mu$m filter, a single drop of a 0.1 N hydrochloric acid solution was added to the filtrate, and the volume was adjusted to 50 ml using de-ionized water. The resulting solution was then analyzed for phosphate content to determine the level of soluble phosphate. In their experiments, the applicants used a Hach DR 2010 spectrophotometer and the 8048 Reactive Phosphorous method for measuring phosphate levels, it is contemplated that other known equipment and methods could be employed with satisfactory results.

In order to establish a baseline reading, a solution was prepared using 400 $\mu$l of stock solution B, a single drop of a 0.1 N hydrochloric acid solution, and sufficient de-ionized water to adjust the volume to 100 ml. The resulting solution was then analyzed to determine its phosphate level. The levels of dispersed and soluble phosphate in the treated solutions could then be expressed as percentages calculated by dividing the readings for dispersed and soluble phosphate by the baseline phosphate reading and multiplying by 100%.

EXAMPLE 1

A series of calcium phosphate inhibition tests were conducted as a function of concentration of quad-polymer. The results of this test are shown in FIG. 2 which graphs the % Dispersed Phosphate vs. Concentration of Polymer in mg/l. FIG. 2 illustrates that the percentage of dispersed phosphate increases with increasing concentrations of polymer. Free and total polymer measurements were made on the samples at the end of the test using the cation resin extraction method followed by UV spectroscopy. FIG. 3 illustrates the relative levels of free and total polymer and the ratio of free to total polymer, this ratio being expressed as a percentage called the % Polymer Inhibition Efficiency.

FIG. 4 illustrates the % Phosphate Dispersion and its relationship to % Polymer Inhibition Efficiency. At low overall levels of polymer, both the polymer inhibition efficiency and the level of dispersed phosphate are low. As the concentration of polymer increases, the difference between the detected levels of free polymer and total polymer decreases, indicating that more of the system polymer is either associated with inhibited particles or remains unreacted. Further, as the system polymer concentration increases, the level of dispersed phosphate also increases. Surprisingly, the applicants found that 100% calcium phosphate dispersion was achieved at a polymer inhibition efficiency of 80%, thereby demonstrating that it is not necessary to maintain near 100% polymer inhibition efficiency in order to achieve excellent phosphate dispersion. This same result also demonstrates that 100% polymer inhibition efficiency is unnecessary and represents a polymer overdose condition. The applicants also found that when the polymer inhibition efficiency decreased below 70%, the level of dispersed phosphate also decreased rapidly, generally leading rapidly to unacceptable levels of system fouling.

From these results, the applicants concluded that efficient operation of an aqueous system is obtained when the polymer inhibition efficiency is sufficiently high to ensure good dispersion of calcium phosphate without reaching an overdose condition in which unnecessary excess polymer is present. Although the overall polymer level and the desired level of polymer inhibition efficiency will be somewhat dependent on the conditions, demands, and the level of control available within the particular aqueous system being treated, the applicants contemplate that polymer inhibition efficiencies between about 75% and 95% will be suitable for most systems.

In connection with their research, the applicants utilized laboratory pilot cooling tower systems that could be operated as small-scale, fully functional evaporative cooling systems. Under typical test conditions, the pilot towers were capable of evaporating approximately 40 gallons of water per day. Makeup water composition and volume was fully controllable and fed from nearby storage tanks. The pilot towers were fully automated using customized data acquisition and control software. FIG. 5 provides a schematic of a typical pilot cooling tower, along with key features of the data acquisition system. Additional details on the pilot cooling tower system and control system used by the applicants were described in "A Computer-Controlled Pilot Cooling Tower: Taking Advantage of the Graphical User Interface," 53$^{rd}$ International Water Conference, Paper No. IWC-92-52.

EXAMPLE 2

To evaluate the utility of the quad-polymer in the present method and to confirm the bench-top experiments reported in Example 1, the applicants conducted pilot cooling tower testing. FIG. 6 shows results of a pilot cooling tower test conducted by the applicants utilizing the quad-polymer. Test conditions are shown below in Table 1. The objective of the test was to evaluate the impact of high-pH upsets on performance of the quad-polymer and verify the utility of the present invention by quantifying free and total polymer levels and calibrating their respective levels as an indicator of system performance. The cationic resin extraction method was used to measure the concentration of free and total polymer.

TABLE 1

| Pilot Cooling Tower Test Conditions | |
| --- | --- |
| Makeup Water | 2-cycle synthetic Richmond tap |
| Cycles of Concentration | 4 |
| Calcium | 300–350 ppm as $CaCO_3$ |

TABLE 1-continued

Pilot Cooling Tower Test Conditions

| | |
|---|---|
| Conductivity | 2,000 μmhos |
| pH | 7.5 baseline |
| Return water temperature | 108° F. |
| Average water velocity | 3 ft/sec |
| Treatment Program | Polymer/phosphate/phosphonate/azole |

As shown in FIG. 6, for the first five days of the experiment, pH was maintained at 7.5–7.6. During this period, free and total polymer averaged 6.4 and 7.2 ppm respectively, with an average polymer inhibition efficiency of 88%. Minimal changes were observed in heat transfer resistance (HTR), as indicated by a pilot cooling tower DATS fouling monitor. On day six of the experiment, pH was raised to 8.6 and maintained at a level of 8.6–8.8 for the next seven days to induce fouling in the system. With the elevation in pH, a slight increase was observed in HTR, with a corresponding slight increase observed in the difference between free and total polymer. The extent to which fouling was induced in the system was much less than had been anticipated based on previous experience with alternative polymers.

Encouraged with the outcome of the high pH excursion, the system was returned to pH 7.6 and polymer levels were reduced by 50%. For the next three days the system was held at the initial pH 7.6 set point. As indicated in FIG. 4, no additional increases in fouling or polymer demand were observed using the reduced polymer level at neutral pH. On day 16 of the experiment, pH was increased to 8.6, and over the next few days incrementally increased to 8.9. As shown in FIG. 4, the reduced level of polymer was not sufficient to maintain stabilization of the system at elevated pH, and beginning on day 18, the polymer inhibition efficiency decreased and fouling rapidly occurred.

The performance breakpoint in treatment of the pilot cooling tower system occurred once free polymer residual was less than 3 ppm, a level that corresponded to a system polymer inhibition efficiency of approximately 75%. Once the polymer inhibition efficiency decreased to this level, fouling occurred. The outcome of the pilot cooling tower test confirmed the applicants' previous bench-top calcium phosphate inhibition studies that had suggested that polymer inhibition efficiency represented a powerful indicator of system performance.

As will be appreciated by persons skilled in the art, various modifications, adaptations, and variations of the present disclosure can be made without departing from the teachings of the present invention.

We claim:

1. A method for controlling the concentration of chemically active components in a liquid system, said liquid system comprising water and chemically active components, said chemically active components including a polymer, said polymer being present in said liquid system as both bound polymer and free polymer, the method comprising:

determining the level of said free polymer in said liquid system;

determining the level of said total polymer in said liquid system, said total polymer comprising the sum of said bound polymer and said free polymer;

calculating the polymer inhibition efficiency of said liquid system from the levels of free polymer and total polymer; and adjusting the rate at which a treatment solution is fed into said liquid system, said treatment solution comprising a known concentration of said polymer, to establish and maintain the polymer inhibition efficiency generally within a predetermined target range, whereby the concentration of the chemically active components in said liquid system is controlled.

2. A method for controlling the concentration of chemically active components in a liquid system according to claim 1, wherein said predetermined target range for said polymer inhibition efficiency consists of a lower target limit and an upper target limit, said lower target limit representing a level of polymer inhibition efficiency sufficient to achieve minimal fouling of said liquid system and said upper target limit being sufficient to prevent significant overdosing of said liquid system with said polymer.

3. A method for controlling the concentration of chemically active components in a liquid system according to claim 2, wherein said lower target limit is at least 70% and said upper target limit is not more than 95%.

4. A method for controlling the concentration of chemically active components in a liquid system according to claim 1, wherein said step of determining the level of said free polymer comprises:

extracting a first sample from said liquid system;

filtering the first sample to remove substantially all of said bound polymer;

treating the first sample to dissolve scale forming particulates; and measuring the level of said polymer in the first sample; and further wherein said step of determining the level of said total polymer comprises:

extracting a second sample from said liquid system;

treating the second sample to dissolve scale forming particulates; and measuring the level of said polymer in the second sample.

5. A method according to claim 4, wherein said steps of treating said first and second samples comprise the addition of sufficient acid or excess chelating agent to said samples to dissolve scale forming particulates.

6. A method according to claim 1, wherein said steps of determining the level of said free polymer and determining the level of said total polymer comprise spectroscopic measurements, said spectroscopic measurements being obtained by one or more spectroscopic methods selected from the group consisting of absorption, transmission, and emission spectroscopy.

7. A method according to claim 1, wherein said steps of determining the level of said free polymer and determining the level of said total polymer comprise precipitation of the polymer followed by a turbidimetric measurement.

8. A method according to claim 1, wherein said steps of determining the level of said free polymer and the level of said total polymer in said liquid system comprise:

withdrawing a first sample from said liquid system, reversibly binding a portion of said polymer present in said first sample to produce a reversibly bound quantity of said polymer;

releasing said reversibly bound quantity of said polymer into solution as released polymer to form a second sample;

measuring the spectra of the released polymer in said second sample; and determining, from said spectra, the level of said polymer in said first sample.

9. A method according to claim 8, wherein:

said polymer is an anionic polymer;

said reversibly binding step comprises reversibly binding said anionic polymer by bringing said first sample into contact with a cationic resin, said cationic resin being selected to reversibly bind said anionic polymer, and washing said cationic resin and reversibly bound anionic polymer with a dilute acid solution, the acidity of said dilute acid solution being less than that necessary to release said reversibly bound anionic polymer from said cationic resin; and said releasing step comprises washing said cationic resin and reversibly bound anionic polymer with a concentrated acid solution, the acidity of said concentrated acid solution being at least sufficient to release said reversibly bound anionic polymer from said cationic resin, the concentrated acid solution containing the released anionic polymer comprising said second sample.

10. A method according to 9, wherein said cationic resin is contained in a disposable cartridge.

11. A method according to 8, wherein the measured spectra is the visible ultraviolet (UV-Vis) spectra.

12. A method according to claim 1, wherein said liquid system is a cooling water system, and further wherein said chemically active components include an anionic polymer and one or more components selected from a group consisting of phosphates, phosphonates, and azoles.

13. A method according to claim 1, wherein said polymer incorporates one or more functional groups, at least one of said functional groups being spectroscopically active, whereby the level of said polymer in said liquid system may be measured directly without using fluorescent tags, protein tags, or other inert or inactive species.

14. A method according to claim 13, wherein said polymer is a quad-polymer.

15. A method according to claim 14, wherein said polymer is Quadrasperse.™

16. A method according to claim 1, wherein said liquid system is a boiler water system, and further wherein said chemically active components include an anionic polymer and one or more components selected from a group consisting of phosphates, phosphonates, chelants, and oxygen-scavengers.

17. A method according to claim 1, wherein one or more of said steps of determining the level of said free polymer, determining the level of said total polymer, calculating the polymer inhibition efficiency, or adding a quantity of a treatment solution to said liquid system, is automated.

18. A method for improving plant performance, said plant comprising one or more liquid systems, said liquid systems comprising one or more chemically active components in water, said method comprising:

modifying at least one of said liquid systems to include a chemically active polymer, said polymer including at least one functional group that permits direct spectroscopic measurement of the polymer, said polymer being present in said liquid system as both bound polymer and free polymer;

determining the level of said free polymer in said liquid system;

determining the level of said total polymer in said liquid system, said total polymer comprising the sum of said bound polymer and said free polymer;

calculating the polymer inhibition efficiency of said liquid system from the levels of free polymer and total polymer; and adjusting the rate at which a treatment solution is fed into said liquid system, said treatment solution comprising a known concentration of said polymer, to establish and maintain the polymer inhibition efficiency within a predetermined target range;

whereby liquid system performance, as indicated by decreased use of treatment solution, improved heat exchanger performance, or reduced maintenance of said liquid system, is improved when compared with the level of performance achieved by said liquid system without said chemically active polymer.

19. A method for improving plant performance according to claim 18, wherein said predetermined target range for said polymer inhibition efficiency is between about 75% and about 95%.

20. A method for monitoring the performance of one or more liquid systems, each said liquid system comprising water and chemically active components, said chemically active components including a polymer, said polymer being present in said liquid system as both bound polymer and free polymer, the method comprising:

determining the level of said free polymer in said liquid system;

determining the level of said total polymer in said liquid system, said total polymer comprising the sum of said bound polymer and said free polymer; and calculating the polymer inhibition efficiency of said liquid system from the levels of free polymer and total polymer.

* * * * *